Inventor:
Edward Brice Killen,

Inventor
Edward Brice Killen

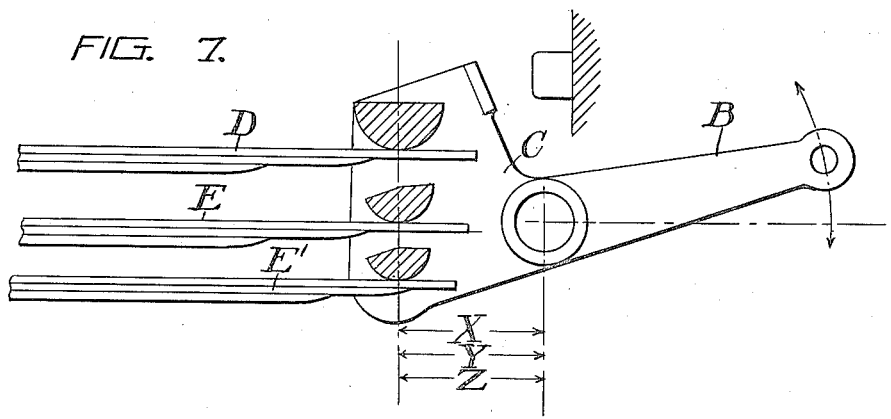
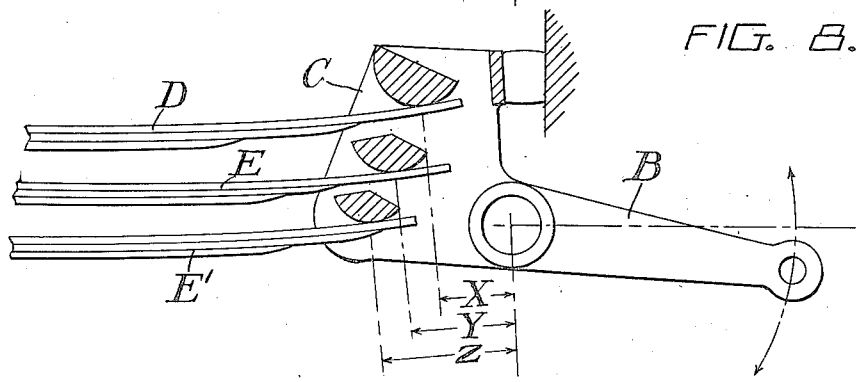
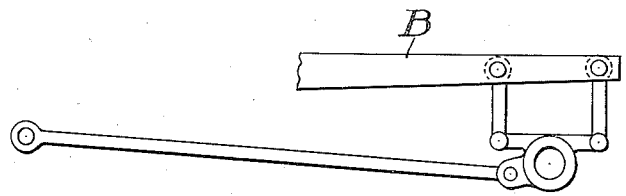
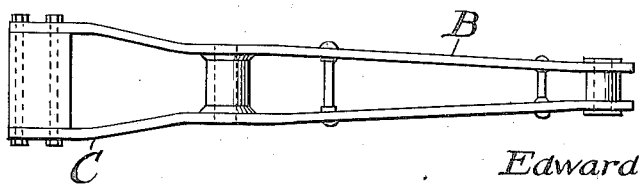

UNITED STATES PATENT OFFICE.

EDWARD BRICE KILLEN, OF LONDON, ENGLAND.

SPRING SHOCK-ABSORBING DEVICE.

1,280,236.  Specification of Letters Patent.  Patented Oct. 1, 1918.

Application filed January 6, 1917. Serial No. 140,892.

*To all whom it may concern:*

Be it known that I, EDWARD BRICE KILLEN, of 27 Queen Victoria street, London, E. C., England, engineer, have invented certain new and useful Improvements in Spring Shock-Absorbing Devices, Particularly Applicable to Vehicles, of which the following is a specification.

Actual experience in the gigantic war struggle going on at present on the Continent of Europe has proved that the shock absorbing qualities of laminated, cantaliver and other steel spring suspensions as at present designed and attached to pleasure and commercial chassis are insufficient in absorbing the road shocks, and that the springs are liable to collapse and break when traveling over bad roads, besides having other serious defects. One reason why the shock absorbing qualities of existing laminated steel springs are poor is because said springs do not allow sufficient rise or vertical movement to be obtained at the axle for absorbing the road inequalities, another reason is that the speed of recovery of the springs to rest is not quick enough to enable them to absorb the enormous number of road shocks met with per minute, and another is that the existing steel suspensions are much too stiff for efficiently suspending light loads, being designed and attached to carry the maximum loads, with the result that commercial chassis when unloaded or running light are practically unsprung. In pleasure chassis many varieties of shock absorbers have been attached to the rear ends of the laminated springs with the object of trying to overcome these difficulties, but such shock absorbers are unable to give the required vertical movements wanted at the rear end of the laminated spring and do not overcome the other defects of existing suspensions as referred to above.

This invention enables existing suspensions to be re-arranged so that the axles of the chassis may have a much greater rise or vertical movement than at present. This is accomplished by using an attachment device which I will call my lever device, and this lever device when suitably constructed and supported in position enables the rear end of a laminated spring or an axle to be securely attached to the chassis in such a manner that the necessary vertical and quick axle movement (without lateral movement) is obtained to enable the road shocks to be efficiently absorbed as and when received, and the suspension is sensitive under light as well as heavy axle loads, besides having many other advantages not obtainable with existing suspensions, either with or without shock absorbers.

In order that my invention may be properly understood and readily carried into effect, I have hereunto appended three sheets of drawings illustrating its application to certain vehicles, in which Figure 1 is a side view of the rear end of a pleasure car, in which the existing laminated spring is retained and my invention adapted thereto.

Figs. 7 and 8 are enlarged views of a part of the above equipment.

Fig. 9 is an illustration of a convenient method of connecting an axle to the lever used in my invention, where a radius rod already exists.

Fig. 10 is a plan view of a lever device constructed in the form of a frame.

Like parts are marked by like reference characters on the drawings.

The construction of the invention may conveniently be as follows:—

Figure 1:
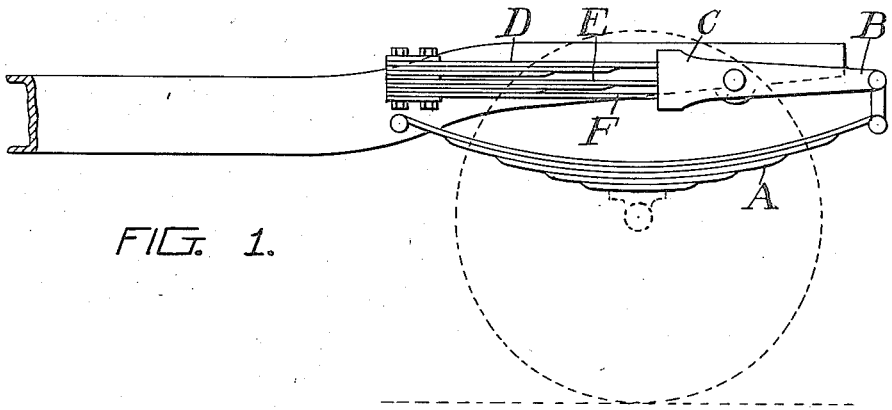

Instead of attaching as at present the rear end of a laminated spring, by a shackle either to the frame of the chassis or to an auxiliary laminated spring attached to the chassis, or to a shock absorber, I may attach it by means of a shackle to the long end of my lever device, see A, Fig. 1. This device is preferably constructed having a long lever end B and a short lever end C, and it is attached to the chassis by means of suitable attachment brackets and a shaft or spindle, on which shaft or spindle the lever device is pivoted, enabling it to rock up and down.

The short end of the lever device may have several distinct and separate leaf springs controlling and supporting it in correct position, and these leaf springs may be attached either to the chassis frame or be incorporated in the lever device by means of bolts, nuts and brackets. If three laminated springs are used, as shown in Fig. 1, I will call them the minimum load supporting leaf spring, marked D, the maximum load supporting leaf spring marked E, and the check leaf spring marked F, and these three laminated springs are constructed capable of supporting sensitively under varying loads the long end of the lever device in its proper position under all working conditions. On account of the vertical movement at the long end of the lever device being greater than at the short end, a great vertical movement is obtained at the rear end of an existing laminated spring when it is suitably attached to the long end of my lever device by means of a shackle.

Figure 2:
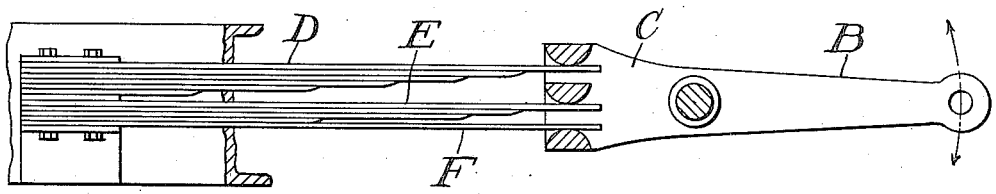
Fig. 2 is an enlarged detail of the lever and spring used in my invention.

By efficiently attaching and supporting the rear end of existing laminated springs, a great range of vertical movement is obtainable at their rear end, and the required sensitiveness is automatically obtained in the axle, thereby enabling the road inequalities to be much more efficiently absorbed than at present. The minimum load supporting leaf spring, the maximum load supporting leaf spring, and the check leaf spring controlling the lever device are arranged to automatically come into effective bearing action as and when required to carry sensitively light or heavy loads, or absorb great shocks, and this suspension enables the minimum and maximum axle loads to be sensitively carried without the risk of the leaf springs breaking under severe road work. The flexible end of each minimum and maximum load supporting leaf spring bears suitably against a bearing formed on a multiple platform bracket, which is constructed at the short end of the lever device, as shown in section in Fig. 2, or is attached to the chassis frame, as will be seen in Fig. 4.

The lever device may be constructed and attached so that say twice the amount of vertical movement may be obtained at the long end of the lever device as compared with the movement at the short end. The check leaf spring may be attached to the load supporting leaf springs at their thick or root end, and each of the flexible spring ends is free to rest and slide on its own bearing on each multiple platform bracket, without the working of any one flexible spring end interfering with the working of the other. The check leaf spring prevents the long lever end of the device from dropping down too low when the wheel of the chassis is off the road.

Figure 3:
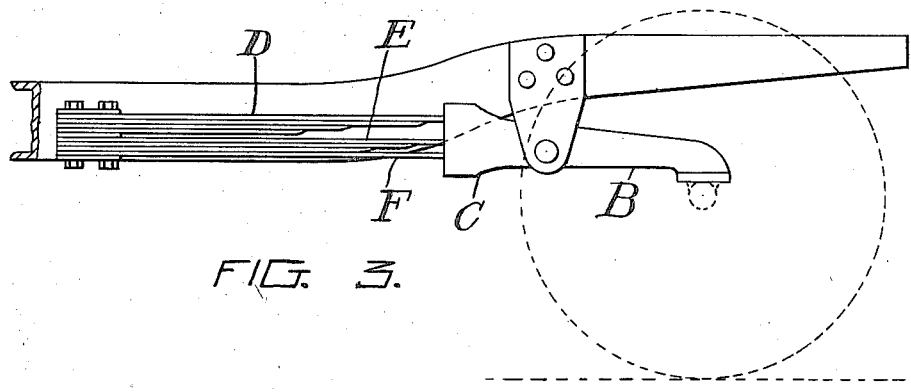
Fig. 3 is a view of the above rear end of a vehicle with the laminated spring removed and the axle directly attached to the long end of the lever device used in my invention.
Figure 4:
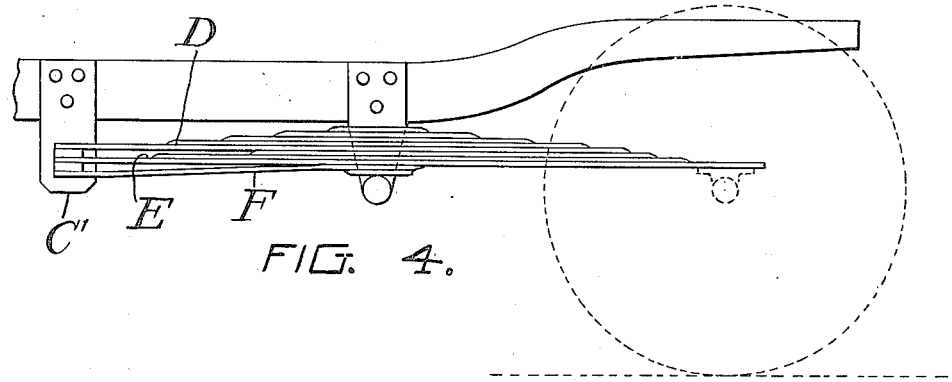
Fig. 4 shows the adaptation of my invention to a vehicle designed to accommodate a pivoted cantaliver spring.

In re-arranging the suspension of a chassis having, for example, two cantaliver springs attached to its back axle, I may use two lever devices instead of the two cantaliver springs, and, as shown in Fig. 3, attach the axle directly or indirectly to the two long ends of the lever devices, each short end of each lever device being supported and controlled by the sensitive ends of three leaf springs which slide and work against three bearings formed on, for example, one multiple platform bracket, the three leaf springs D, E and F being suitably attached together at their thick or root ends to, for example, the chassis frame. When the leaf springs are attached to the chassis frame, the multiple platform bracket with its three bearings is attached to or forms part of the short end of the lever device, but when the leaf springs form part of the lever device, the multiple platform bracket with its three bearings is attached to the chassis frame. In this invention, I may make use of existing cantaliver springs which are attached to a chassis frame by means of a pivot or shaft and re-arrange them so that they become lever devices, as shown in Fig. 4, and each cantaliver spring may, if wanted, be arranged to have a long and a short spring end, when the short spring end would rest and slide free on a suitable multiple platform bracket $C^1$ attached to the chassis frame, and be capable of supporting sensitively the minimum axle load. The maximum load supporting leaf spring and a check leaf spring being added and attached at the thick fulcrum part of the cantaliver spring, so as to lie, for example, below the short minimum load supporting spring end, each of the three sensitive ends of the three leaf springs being free to rest and slide against its own bearing on the multiple platform bracket attached to the chassis frame, thereby making the existing cantaliver spring into my lever device, in which the long end is a spring as well as the short end, or if the existing cantaliver spring of a chassis is long and gives a sufficient range of vertical axle movement to efficiently absorb the road shocks, the spring ends may be the same length, and the leaves at one end sub-divided to sensitively carry the minimum load up to the maximum load, and be provided with a check spring. Corresponding bearings in a multiple platform bracket attached to the chassis frame would be provided for the spring ends to work against as described above. In transforming an existing cantaliver spring into an automatically sensitive lever suspension the axle attachment may remain the same as at present, but the entire lever device is flexible, see Fig. 4.

Figure 5:
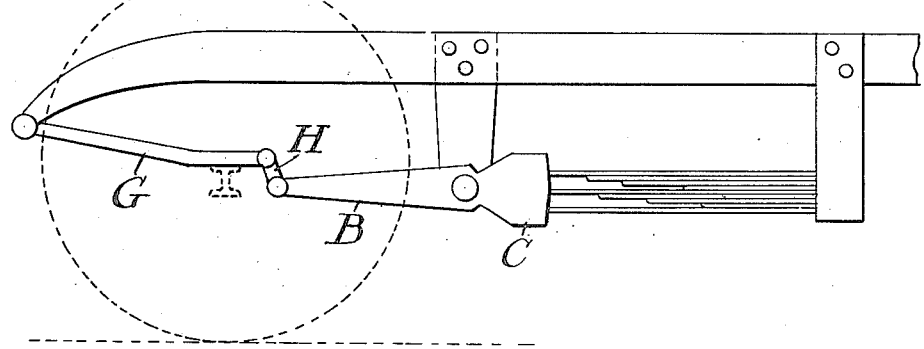
Fig. 5 shows a side view of the front axle of a pleasure car with the usual laminated spring entirely replaced by my equipment.

In sensitively suspending the front axle, the short end of the lever device may be arranged so that the long lever end of the device extends toward the front of the chassis or car instead of toward the back, and placed in suitable position above or below the axle, or the long end of the lever device may be attached by means of a suitable shackle to the rear end of a suitable connecting rod or frame, as shown in Fig. 5, which connecting rod or frame G is attached at its front end to the front of the chassis frame by a pin, (using the same hole as is used at present to attach the end of an existing laminated spring) and to the rear end of the connecting rod or frame, I may attach the long end of the lever device by a shackle H, the axle being rigidly attached to the rear end of the connecting rod instead of the long end of the lever device, or the axle may be attached in any well known way to the end of the long lever device. This enables a sensitive axle attachment to be obtained at the front of a chassis which axle has a great vertical rise, without interfering with the working parts or frame of the chassis. If the connecting rod or frame is used, the shackle H which connects the long end of the lever device to the rear end of the connecting rod, enables the long end of the lever device and the connecting rod to work through the arcs of their respective circles efficiently without interfering with the working parts of the chassis or frame.

There is no mechanical difficulty in sensitively suspending under varying loads both back and front axles by means of this invention, doing away with the necessity for using the existing shock absorbers in pleasure chassis at the rear end of leaf springs, because by using this invention the required vertical axle rise to absorb the road shocks is obtained, and the frequency of return to repose of the leaf springs to enable the numerous road shocks met with per minute to be absorbed is also obtained, whether the chassis or vehicle is lightly or fully loaded. In commercial vehicles where the axle weight varies enormously according to the loads carried, see Fig. 6, I may, if wanted, attach three load supporting tail springs D, E and $E^1$ instead of two to enable the minimum and the varying loads up to the maximum to be sensitively carried, the sensitive ends of the three load supporting leaf springs coming into effective action, and going out again automatically as and when required according to the loads carried, the laminated springs being preferably attached direct to the chassis frame, thereby enabling these laminated springs, which control the vertical movement of the lever devices, to be themselves part of the chassis dead weight and therefore spring-borne in common with it, instead of being a direct load on the axle.

Figure 6:
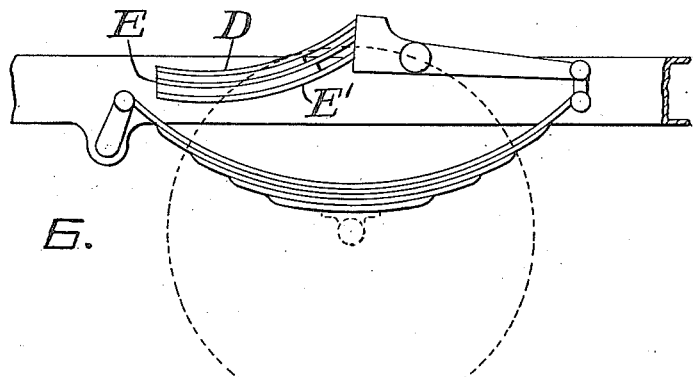
Fig. 6 is the side elevation of the rear end of a heavy lorry in which my invention is applied as an accessory to the existing laminated spring.

By reference to Figs. 6, 7 and 8, the effects of great variation of load will be understood. Thus Fig. 6 shows a minimum load being carried, all springs being of course much curved instead of almost flat as when heavily loaded. In the latter case as shown in Fig. 7, the effective radius of the three platforms is identical, see X, Y and Z, but when the minimum load is carried as shown in Fig. 8, the radius of each platform changes, causing the spring ends to increase and decrease in their effective strength automatically (as regards the leverage at which they act on the pivoted lever, which action is more pronounced in a short armed lever than in a long armed lever), also as will be seen from the illustration the effective length of each spring is also changed, still further affecting the effective strength of the same.

By making the spring $E^1$ of thinner metal than the others it can (in the position shown in Fig. 8 where most of the duty falls upon it) be arranged to be very flexible so that the minimum load is sensitively carried even although the thicker springs have reached the limit of their motion and were giving no support whatever.

Fig. 9 illustrates in detail a construction whereby the lever B of this invention may be connected to an axle where a radius bar already exists. Fig. 10 illustrates in plan view, a skeleton form of the lever B which might be used instead of the forms of levers shown in the other views.

Whatever the state of the loading, the springs, when affected through an unequal armed lever such as illustrated, receive only half the vertical velocity of reciprocation which the long end of the lever receives, and therefore inertia and momentum stresses are much reduced so that quick periodicity or frequency of repose are secured for the springs.

An important feature of the invention is that the great vertical axle rise required to efficiently absorb the maximum road shocks is obtained without the leaf springs being subjected to excessive deflection, because a small vertical movement at the sensitive spring ends may give a great vertical movement at the long end of the lever device, and long laminated springs may be used in my suspension without trouble from a slow periodicity. When the rear end of an existing laminated spring is attached to the long lever end of the device, said rear end may, if required, be arranged to be lower and nearer to the ground than at present, (without interfering with the working conditions of the chassis) which means that the existing laminated spring may assume under such conditions a position not so horizontal as at present.

It is to be noted that my lever suspension may be suitably attached in position to a chassis, carriage or vehicle in many different ways to sensitively spring the chassis whether lightly or fully loaded.

This invention enables motor cars, tricars, commercial vehicles and carriages to be sensitively spring-supported under many varying loads and conditions, and the invention is also applicable to wheels, machines and other devices, when shocks or vibrations require to be absorbed. In attaching the lever device in position, I may use a shaft or spindle, which is easily detached and renewed, and it is to be noted that all the various parts of my lever suspension, including the leaf springs, may be constructed in suitable shapes and dimensions to sensitively suspend the varying loads.

By means of this invention the frequency of the state of repose of suspensions is increased and the objectionable characteristics of laminated spring leaves are lessened, the improved spring suspension being constructed and attached so that the sensitive free sliding ends of the laminated springs always control and support the long end of the lever device in correct position under all varying loads, the spring ends coming into effective bearing, and going out again on their respective platforms without clatter or noise.

Although the illustrations herein given serve to make clear the description of my invention, it must be understood that I do not necessarily confine myself to the exact details here shown which may obviously be departed from or modified in many ways while still conforming in essence to my invention.

Claims:

1. The combination with a support and an object to be sustained therefrom, of an interposed laminated spring comprising a plurality of free spring ends, and a resistance member or multiple platform bracket having a plurality of bearings slidingly engaged by said free spring ends.

2. The combination with a vehicle axle and a frame or body part to be supported therefrom, of an interposed laminated spring comprising a plurality of free spring ends, and a resistance member or multiple platform bracket having a plurality of bearings slidingly engaged by said free spring ends.

3. The combination with a support and an object to be sustained therefrom, of a laminated spring interposed between said support and object and comprising a plurality of free spring ends, a lever also interposed between said support and object and provided with a plurality of bearings slidingly engaged by said free spring ends.

4. The combination with a vehicle axle and a frame or body part to be supported therefrom, of a laminated spring interposed between said support and axle and comprising a plurality of free spring ends, a lever also interposed between said support and axle and provided with a plurality of bearings slidingly engaged by said free spring ends.

5. The combination with a support and an object to be sustained therefrom, of a laminated spring interposed between said support and object and comprising a plurality of free spring ends, a lever also interposed between said support and object and provided with a plurality of bearings slidingly engaged by said free spring ends, said lever having arms of unequal length and said bearings being on the shorter arm of said lever.

6. The combination with a vehicle axle and a frame or body part to be supported therefrom, of a laminated spring interposed between said support and axle and comprising a plurality of free spring ends, a lever also interposed between said support and axle and provided with a plurality of bearings slidingly engaged by said free spring ends, said lever having arms of unequal length and said bearings being on the shorter arm of said lever.

7. The combination with a vehicle axle and a vehicle frame or body part to be supported therefrom, of a laminated spring connected with said frame or body part and having a plurality of free spring ends, a lever also connected with said frame or body part and having a plurality of bearings slidingly engaged by said free spring ends, and a second laminated spring connected with said frame or body part and with said axle and with one end of which one arm of said lever has a jointed connection.

8. The combination with a vehicle axle and a vehicle frame or body part to be supported therefrom, of a laminated spring connected with said frame or body part and having a plurality of free spring ends, a lever also connected with said frame or body part and having a plurality of bearings slidingly engaged by said free spring ends, and a second laminated spring connected with said frame or body part and with said axle and with one end of which one arm of said lever has a jointed connection, said lever having arms of unequal length and said bearings being on the shorter arm of said lever.

In witness whereof I affix my signature in presence of two witnesses.

EDWARD BRICE KILLEN.

Witnesses:
 JOHN LIDDLE,
 JOHN TRAIN LIDDLE.